(12) United States Patent
Schumacher et al.

(10) Patent No.: US 11,464,369 B2
(45) Date of Patent: Oct. 11, 2022

(54) MOUNTING SYSTEM AND METHOD (71) Applicant: Kohler Co., Kohler, WI (US)

(72) Inventors: Jeffrey A. Schumacher, Port Washington, WI (US); Chandrika Abhang, Sheboygan, WI (US); Cary D. Edmonds, Plymouth, WI (US)

(73) Assignee: KOHLER CO., Kohler, WI (US)

( * ) Notice: Subject to any disclaimer, the term of this patent is extended or adjusted under 35 U.S.C. 154(b) by 41 days.

(21) Appl. No.: 15/296,617

(22) Filed: Oct. 18, 2016

(65) Prior Publication Data
US 2018/0106420 A1 Apr. 19, 2018

(51) Int. Cl.
*A47K 10/10* (2006.01)

(52) U.S. Cl.
CPC .......... *A47K 10/10* (2013.01); *A47K 2201/00* (2013.01)

(58) Field of Classification Search
CPC .... F16B 2013/10; F16B 13/04; F16B 13/045; F16B 45/00; F16B 13/08; F16B 13/0808; A47K 2201/02; A47K 10/04; A47K 10/10; A47K 10/12; A47K 2201/00; A47K 17/022
USPC ............ 411/338, 339, 400, 450; 248/222.14, 248/304, 220.21, 220.22, 220.31, 216.1, 248/217.3, 217.4, 546; 211/6, 16, 88.04
See application file for complete search history.

(56) References Cited

U.S. PATENT DOCUMENTS

| | | | | |
|---|---|---|---|---|
| 1,051,893 A | * | 2/1913 | Joseph | F16B 13/0808 248/231.21 |
| 1,386,202 A | * | 8/1921 | Peterson | F16B 13/0808 411/346 |
| 1,795,059 A | * | 3/1931 | Vance | A47G 25/0607 248/304 |
| 2,542,753 A | * | 2/1951 | De Swart | A47B 57/30 248/239 |
| 2,576,511 A | * | 11/1951 | Jewett | E05B 1/0015 16/402 |
| 2,789,783 A | | 6/1953 | Hanger | |
| 3,127,808 A | * | 4/1964 | Drybread, Sr. | F16B 13/0808 411/346 |
| 3,628,762 A | * | 12/1971 | Williams | F16B 21/088 248/235 |
| 4,406,108 A | * | 9/1983 | Beck | F16B 15/00 411/340 |
| 4,530,630 A | * | 7/1985 | Brown | F16B 13/04 411/340 |

(Continued)

FOREIGN PATENT DOCUMENTS

| | | |
|---|---|---|
| CN | 103237997 | 8/2013 |
| JP | 2004137798 | 5/2004 |

OTHER PUBLICATIONS

English language summary of Chinese Office Action, App. No. 201710681058.0, Kohler Co. (dated Jun. 11, 2020).

*Primary Examiner* — Jonathan Liu
*Assistant Examiner* — Guang H Guan
(74) *Attorney, Agent, or Firm* — Foley & Lardner LLP (57) ABSTRACT

A mounting system includes an arm having a first end and a second end, the first end configured to engage a first side of a wall. The mounting system further includes a bracket configured to engage a second side of the wall opposing the first side, the bracket coupled to the arm by a fastener, wherein the second end of the arm is configured to engage the first side of the wall at a location offset from the fastener.

19 Claims, 10 Drawing Sheets

(56) References Cited

U.S. PATENT DOCUMENTS

| | | | | |
|---|---|---|---|---|
| 4,793,755 | A * | 12/1988 | Brown | F16B 13/0808 411/342 |
| 5,050,252 | A * | 9/1991 | Cuttriss | A47K 3/003 211/105.2 |
| 5,149,037 | A * | 9/1992 | Smith | A47F 5/0876 248/216.1 |
| 5,205,692 | A * | 4/1993 | Kelbert | F16B 5/0216 411/173 |
| 5,275,518 | A * | 1/1994 | Guenther | E04F 11/18 411/344 |
| 5,881,982 | A | 3/1999 | Hollingsworth et al. | |
| 5,954,306 | A * | 9/1999 | Hoover | A47B 96/027 248/250 |
| 6,112,344 | A * | 9/2000 | Guenther | A47K 3/003 248/222.51 |
| 6,186,455 | B1 | 2/2001 | Hollingsworth et al. | |
| 6,578,235 | B2 * | 6/2003 | Womack | E05B 1/0015 16/412 |
| 6,641,344 | B2 | 11/2003 | Weiss | |
| 7,219,394 | B2 * | 5/2007 | Wu | E05B 1/0015 16/412 |
| 7,540,458 | B2 | 6/2009 | Forbes | |
| 7,547,171 | B2 * | 6/2009 | McDuff | A47G 1/20 411/400 |
| D649,437 | S | 11/2011 | McDuff et al. | |
| 8,082,859 | B2 * | 12/2011 | Sevack | A47B 96/066 108/152 |
| 8,109,705 | B1 | 2/2012 | Brown et al. | |
| 8,197,169 | B2 | 6/2012 | Ernst | |
| 8,303,224 | B2 * | 11/2012 | McDuff et al. | F16B 13/003 411/341 |
| 8,303,225 | B2 * | 11/2012 | Kearl | F16B 37/044 411/344 |
| 10,180,157 | B1 * | 1/2019 | Glickstein | A63B 21/00 |
| 10,774,862 | B2 * | 9/2020 | Williams | F16B 13/0808 |
| 2002/0166210 | A1 | 11/2002 | Womack et al. | |
| 2018/0106420 | A1 * | 4/2018 | Schumacher | F16B 13/045 |

* cited by examiner

MOUNTING SYSTEM AND METHOD

BACKGROUND

The present application relates generally to the field of mounting systems for mounting an object to a wall. More specifically, the mounting system relates to mounting an object to a location on a wall where there is no stud.

Hollow-cavity (e.g., stud and drywall) wall construction can make it difficult to securely mount objects to a wall. For example, items such as handrails, towel bars, and shelving may require fasteners to be located by a wood stud in order to support the load applied to the item. However, installation of these items is limited to the underlying wall construction (e.g., placement of studs) because drywall alone is insufficient to withstand the loading with a conventional mounting system.

Conventional drywall anchors may provide a mounting point, but the anchors cannot support significant loads. Other anchors made for higher loads are often complex, difficult to install, expensive, and/or designed for a single use (e.g., the parts are not removable from the cavity when unfastened).

SUMMARY

One embodiment relates to a mounting system, including an arm having a first end and a second end, the first end configured to engage a first side of a wall. The mounting system further includes a bracket configured to engage a second side of the wall opposing the first side, the bracket coupled to the arm by a fastener, wherein the second end of the arm is configured to engage the first side of the wall at a location offset from the fastener.

Another embodiment relates to a mounting system for a wall having a front side, a rear side, and a first hole extending therethrough, the mounting system including a first mounting assembly. The first mounting assembly includes an arm having a first end and a second end, the first end engaging the first side of a wall, and a projection extending from the first end, the projection received in the first hole. The first mounting assembly further includes a bracket engaging the second side of the wall opposing the first side, the bracket defining a receiver configured to receive the projection, and a fastener extending through the first hole, the fastener coupling the arm and the bracket. The second end of the arm engages the first side of the wall at a location offset from the fastener.

Another embodiment relates to a method of installing a mounting system, including feeding an arm of a mounting system through a hole in a wall from a first side to a second side of the wall, the arm coupled to a bracket with a fastener. The method further includes engaging the first side of the wall with the arm, bringing the arm and the bracket toward each other by tightening the fastener, and frictionally engaging the wall between the arm and the bracket.

DETAILED DESCRIPTION

Referring generally to the FIGURES, a mounting system for mounting an object to a wall is shown according to an exemplary embodiment. The mounting system is configured to distribute a load across a section of drywall covering a wall cavity, or a similar structure.

Figure 1:
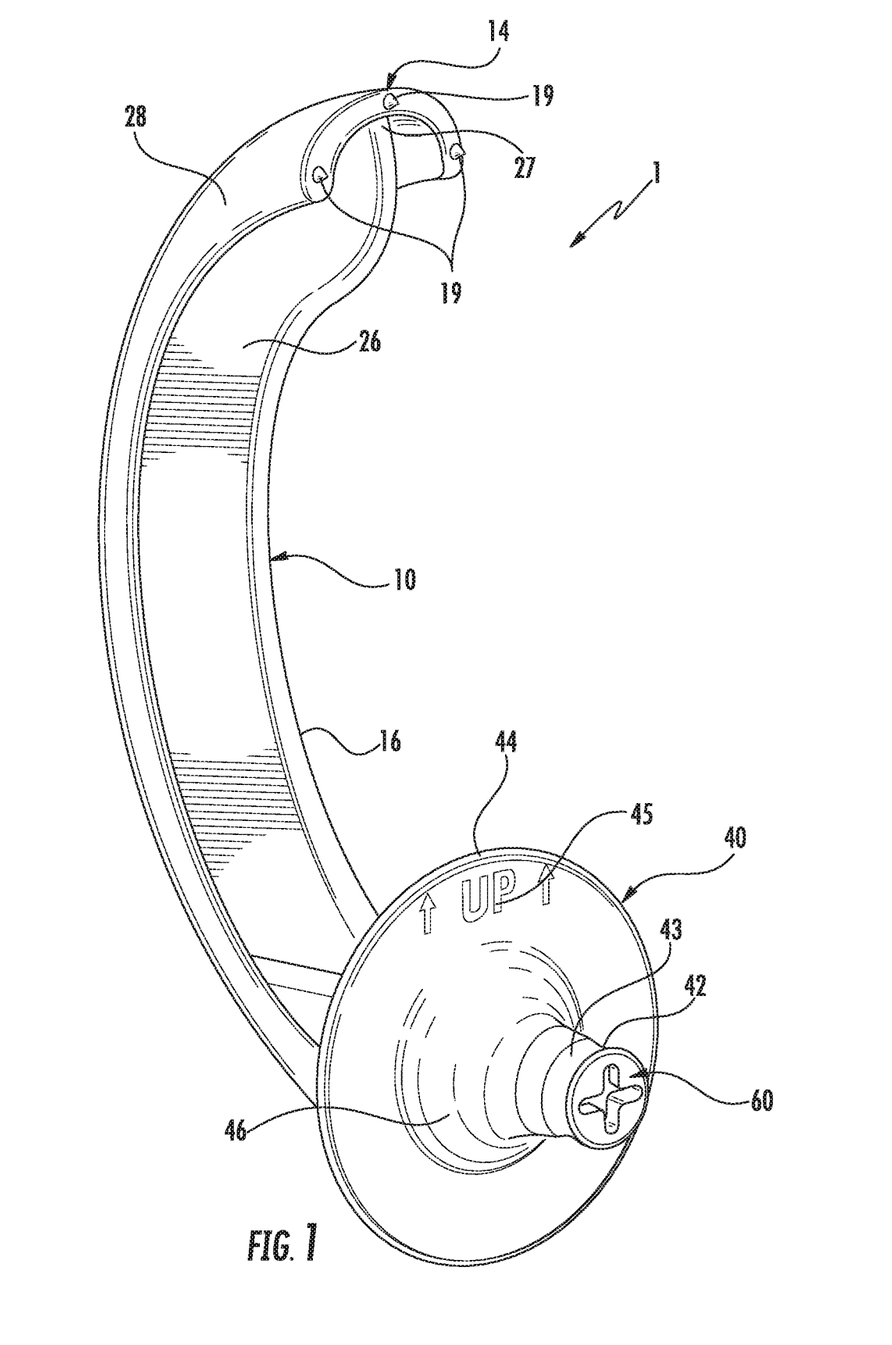
FIG. 1 is a perspective view of the mounting system, according to an exemplary embodiment.
Figure 2:
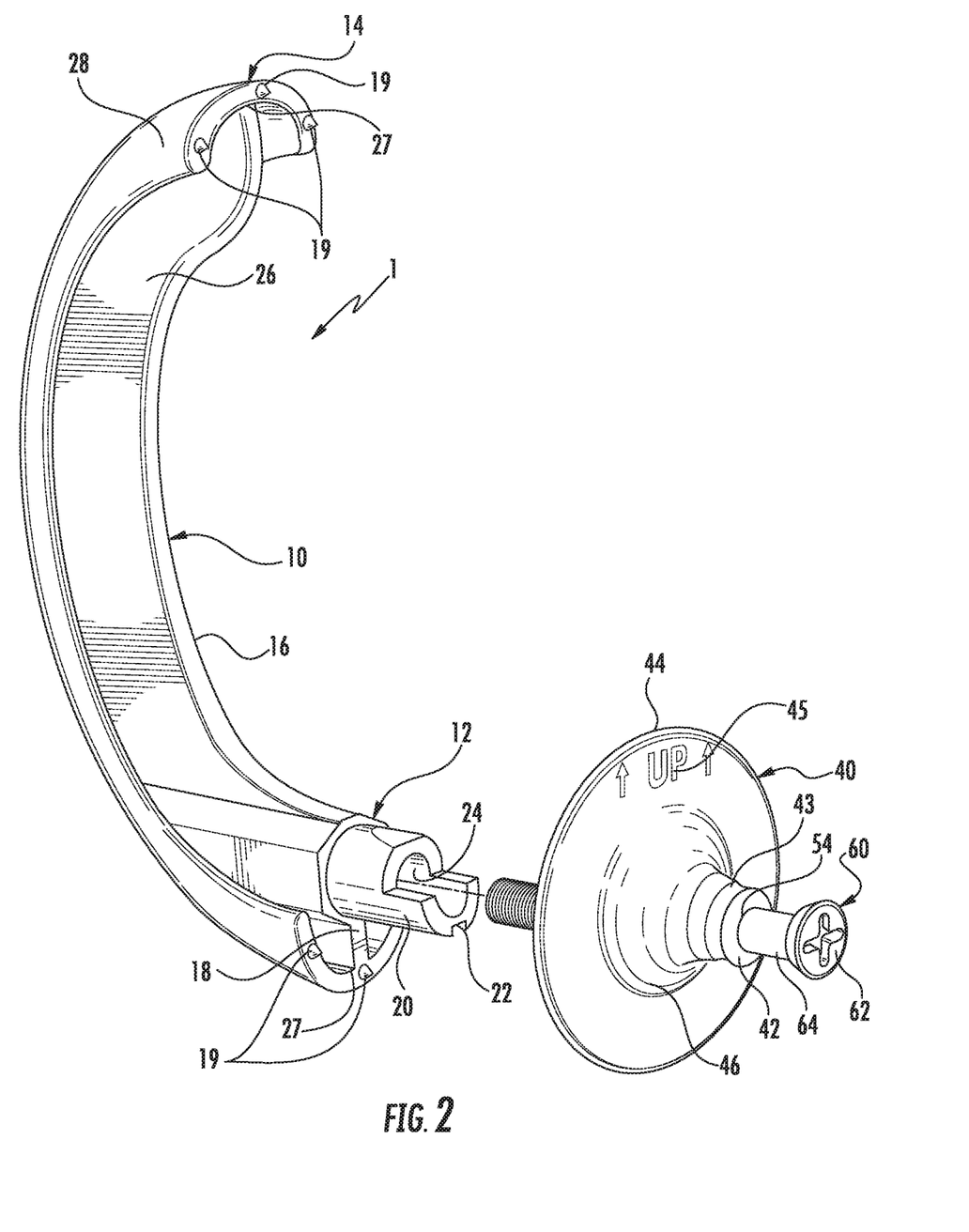
FIG. 2 is an exploded view of the mounting system of FIG. 1.
Figure 3:
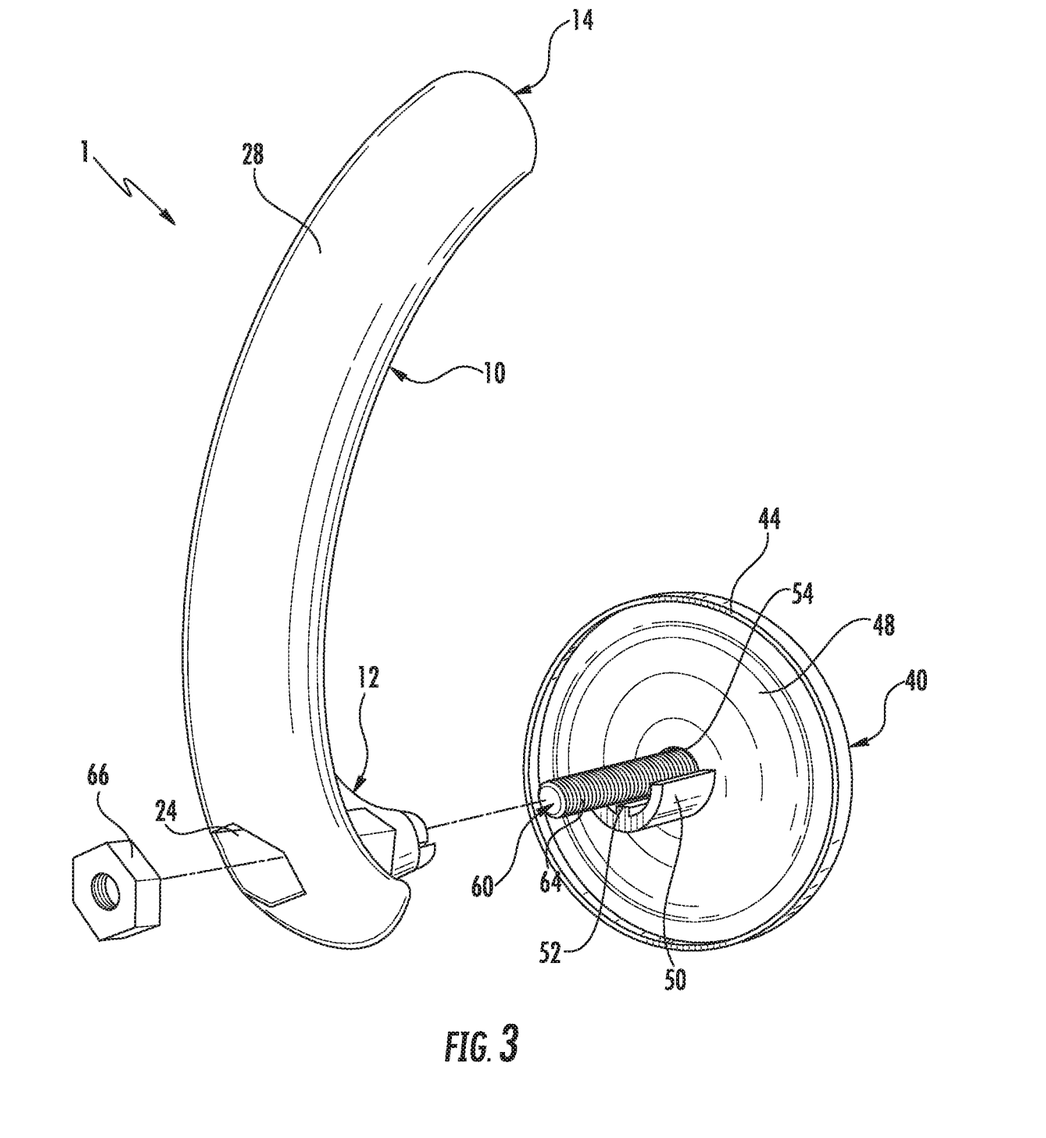
FIG. 3 is another exploded view of the mounting system of FIG. 1.

Referring now to FIGS. 1-3, a mounting system 1 is shown according to an exemplary embodiment. The mounting system 1 includes an arm 10, a bracket 40, and a fastener 60 coupling the arm 10 to the bracket 40. As shown in FIGS. 4A-4D, the arm 10 and the bracket 40 are configured to clamp opposing sides of a wall 70 (e.g., a surface) therebetween, such that the mounting system 1 is secured in an upright orientation when installed in the wall 70. As shown in FIGS. 5A-5C, the wall 70 may be constructed from a span of drywall extending between offset studs 71.

Referring now to FIGS. 1-3 generally and FIG. 2 specifically, the arm 10 defines a first end 12, a second end 14, and a generally arcuate body 16 extending therebetween. The first end 12 includes a substantially flat end surface 18 (e.g., a first end surface) configured to rest flush against a rear (i.e., first) side 72 of the wall 70. According to an exemplary embodiment, each of the first and second ends 12, 14 may include a plurality of conical-shaped points 19 (e.g., nubs, projections) for engaging the rear side 72 of the wall 70. Engagement of points 19 with wall 70 may prevent sliding and/or rotation of arm 10 relative to wall 70 and increase the stability of mounting system 1. As shown in FIG. 2, the plurality of points 19 may include three points 19 at each of the first end 12 and the second end 14, although according to other exemplary embodiments, each end 12, 14 may include more or fewer points 19. According to another exemplary embodiment, points 19 may be disposed on only one of the ends 12, 14. According to another exemplary embodiment, points 19 may be formed on the bracket 40 and configured to engage a front (i.e., second) side 74 of the wall 70 opposing the rear side 72 of the wall 70. Each of the points 19 may extend away from and substantially perpendicular to the corresponding end 12, 14 (e.g., the end surface 18). As shown in FIG. 4D, the points 19 may indent the wall 70 at their respective locations, such that the interaction of the points 19 and the indentation (e.g., dimple, recess) restricts the rotation of the arm 10 against the wall 70. The formation of indentations by the points 19 may facilitate stabilizing the mounting system 1, particularly when the mounting system 1 is the sole mounting point for a given fixture (e.g., open-ended hand towel holder, vertical toilet paper holder, etc.) mounted on the wall 70. The indentations may be formed as the arm 10 is brought into engagement with the rear side 72 of the wall 70.

Referring to FIGS. 1-3, a projection 20 extends from the end surface 18 away from the body 16 and defines a groove 22 configured to receive a corresponding key 52 defined by the bracket 40. According to another exemplary embodiment, the bracket 40 may define the groove 22 and the projection 20 may define the corresponding key 52. The key 52 is received in the groove 22 and is configured to hold the arm 10 in a fixed orientation relative to the bracket 40. According to other exemplary embodiments, the arm 10 may be held in a fixed orientation with respect to the bracket 40 in other ways. The end surface 18 and/or the projection 20 define a bore 24 configured to receive the fastener 60 therein for coupling the bracket 40 to the arm 10. The bore 24 may extend from the end surface 18 linearly through a portion of the first end 12 of the arm 10. The bore 24 may be configured to retain a nut in a specific orientation. For example, all or a portion of the bore 24 may be hexagonal and configured to engage the nut 66 therein. According to another exemplary embodiment, the bore 24 may have other shapes configured to complement and engage a corresponding nut 66. According to another exemplary embodiment, the bore 24 may be substantially circular. In this configuration, the bore 24 may be internally threaded and configured to receive and threadably engage the fastener 60.

The body 16 defines a cross section having a general "T" shape. The body 16 includes a first member 26, which extends between the first end 12 and the second end 14 and has a profile defining an arc (e.g., semi-circle). The first member 26 is substantially flat and provides structural rigidity to the arm 10. A second member 28 is disposed at an outer periphery 27 of the first member 26 and forms an arc profile complementary to that of the first member 26. A cross section of the second member 28 defines an arc (e.g., semi-circle) and connects to the outer periphery 27 of the first member 26 at a centerline of the second member 28. The first member 26 and the second member 28 are integrally formed, although according to another exemplary embodiment, the first member 26 and the second member 28 may be separately formed and coupled. The bore 24 extends through the second member 28 such that the bore 24 may be accessed to receive the nut 66 therein.

The bracket 40 includes a first end 42, a second end 44, and a body 46 extending therebetween. The first end 42 includes an inset portion 43 (e.g., and indent) configured to engage a fixture 80 with an interference fit. The body 46 defines a radius generally parabolic from the first end 42 to the second end 44. According to other exemplary embodiments, the body 46 may define a profile having other shapes (e.g., square, hexagonal, etc.) for facilitating mating and connection with the fixture 80. The second end 44 of the bracket 40 includes a substantially flat end surface 48 (i.e., second end surface) configured to rest flush against the front side 74 of the wall 70. As shown in FIG. 3, the end surface 48 of the bracket 40 is substantially circular, although other shapes may be used. The end surface 48 may be larger than a hole 76 in the wall 70 configured to receive the arm 10, such that the hole 76 is concealed when the bracket 40 is installed in (e.g., abuts) the wall. The hole 76 may be large enough to receive the arm 10 therethrough. For example, a diameter of the hole 76 may be configured to receive the cross section of the second member 28.

Referring to FIG. 3, the bracket 40 further defines a receiver 50 extending from the end surface 48, away from the body 46. The receiver 50 includes the key 52 extending radially therefrom. As discussed above, the key 52 engages the groove 22 in the bracket 40, holding the bracket 40 rotationally fixed relative to the arm 10. The bracket 40 may be labelled with a directional guide 45 visible from the first end 44. For example, as shown in FIG. 1, the bracket 40 may be embossed with the word "UP" with arrows corresponding to the direction the arm 10 extends from the bracket 40. According to other exemplary embodiments, the orientation of the mounting system 1 may be indicated in other ways. When the mounting system 1 is being installed in the wall 70, a user may adjust the orientation of the arm 10 by rotating the bracket 40. For example, the user may position the arm 10 to extend substantially vertically upward by rotating the bracket 40 such that the directional guide 45 is oriented in the desired position (e.g., at the top of the bracket 40).

As shown in FIG. 3, the receiver 50 is a semi-circle having an inner diameter substantially the same as an outer diameter of the projection 20. According to other exemplary embodiments, the receiver 50 and the projection 20 may include other complementary shapes or features (e.g., square, triangular, hexagonal, etc.) such that the projection 20 is received in and engages the receiver 50. According to another exemplary embodiment, the receiver 50 may be received in the projection 20. A bore 54 extends through the body 46 from the first end 42 to the second end 44 and is configured to receive the fastener 60 therethrough. The bore 54 may further extend through the receiver 50. The bore 54 is substantially cylindrical, although other shapes may be used (e.g., square, triangular, hexagonal, etc.). According to an exemplary embodiment, the bore 54 may be internally threaded and configured to threadably engage the fastener 60.

Referring now to FIGS. 4A-4D, the fastener 60 may be a bolt or a screw having a head 62 and a threaded body 64. The head 62 may be larger than the bore 54 at the first end 42 of the bracket 40. The head 62 is configured to force the bracket 40 toward the arm 10 when the fastener 60 is tightened, preventing the fastener 60 from passing through the bore 54. The body 64 is externally threaded and engages a nut 66 disposed in the bore 24 of the arm 10, the nut 66 rotationally fixed relative to the bore 24 with a complementary shape. For example, the nut 66 engages a shoulder 68 in the bore 24, preventing the nut 66 from passing through the bore 24 to the first end 12 of the arm 10. According to another exemplary embodiment, the body 64 is received in a threaded bore 24 without a nut 66. When the fastener 60 is tightened, the arm 10 and the bracket 40 are moved toward each other, such that the arm 10 and the bracket 40 clamp a portion of the wall 70 therebetween. According to other exemplary embodiments, the fastener 60 may be another type of fastener configured to couple the arm 10 and the bracket 40, such that the arm 10 and the bracket 40 may be moved toward each other to clamp a portion of the wall 70 therebetween.

Figure 4A:
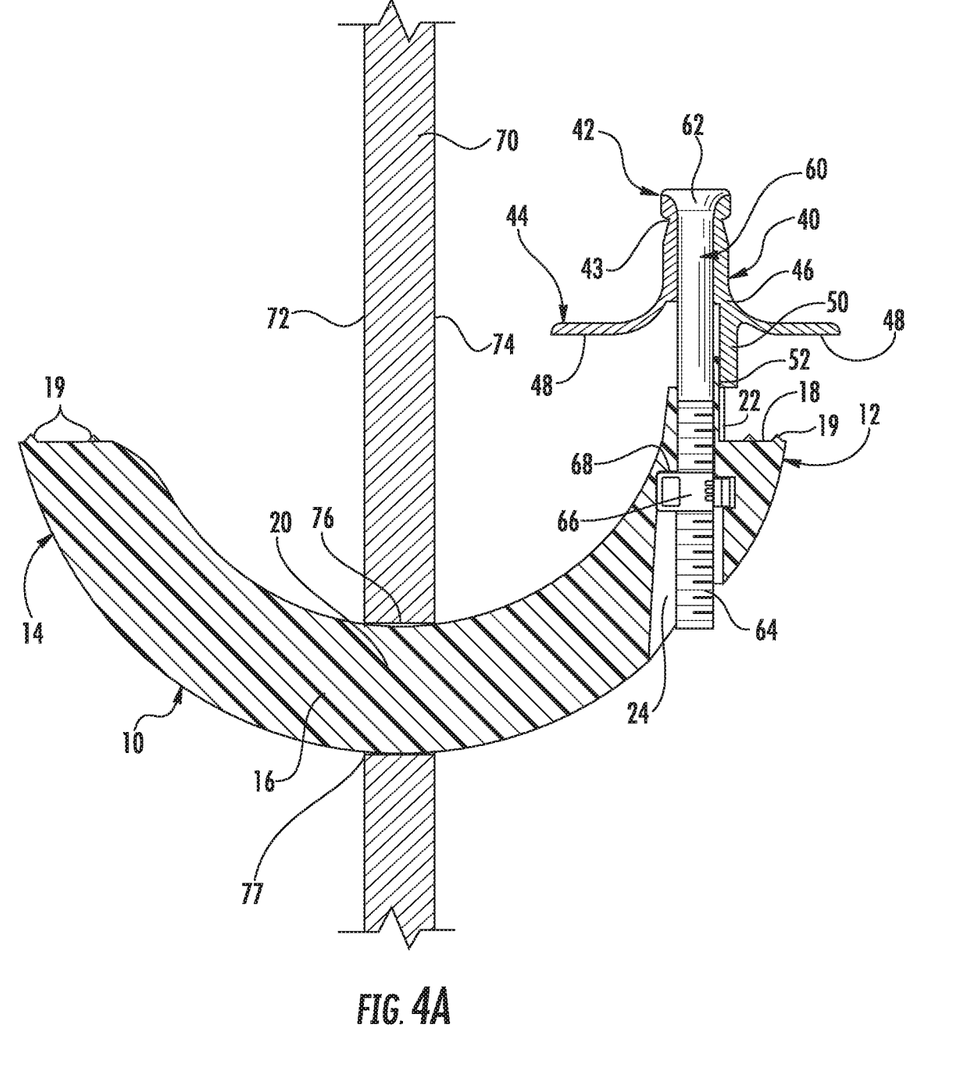
FIG. 4A is a cross-sectional view of the mounting system being installed in a hole in the wall, according to an exemplary embodiment.
Figure 4B:
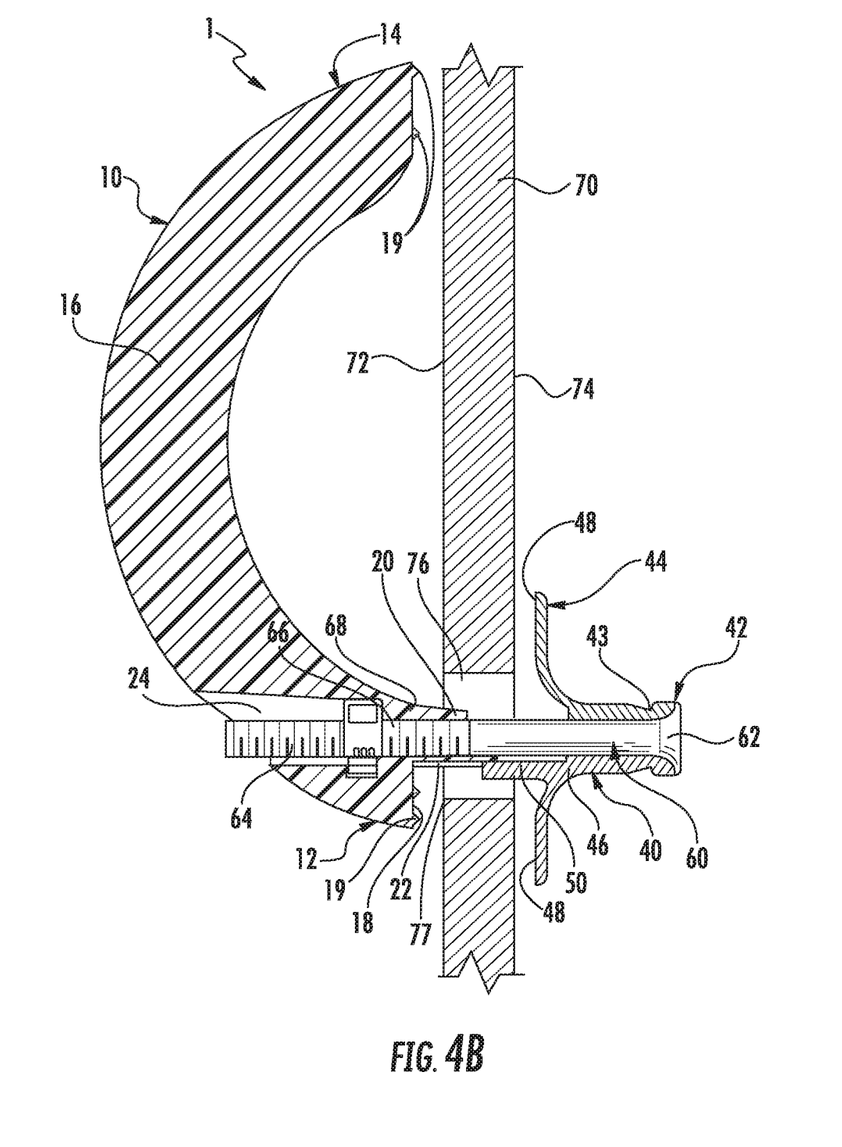
FIG. 4B is a cross-sectional view of the mounting system of FIG. 4A fully received in the hole.
Figure 4C:
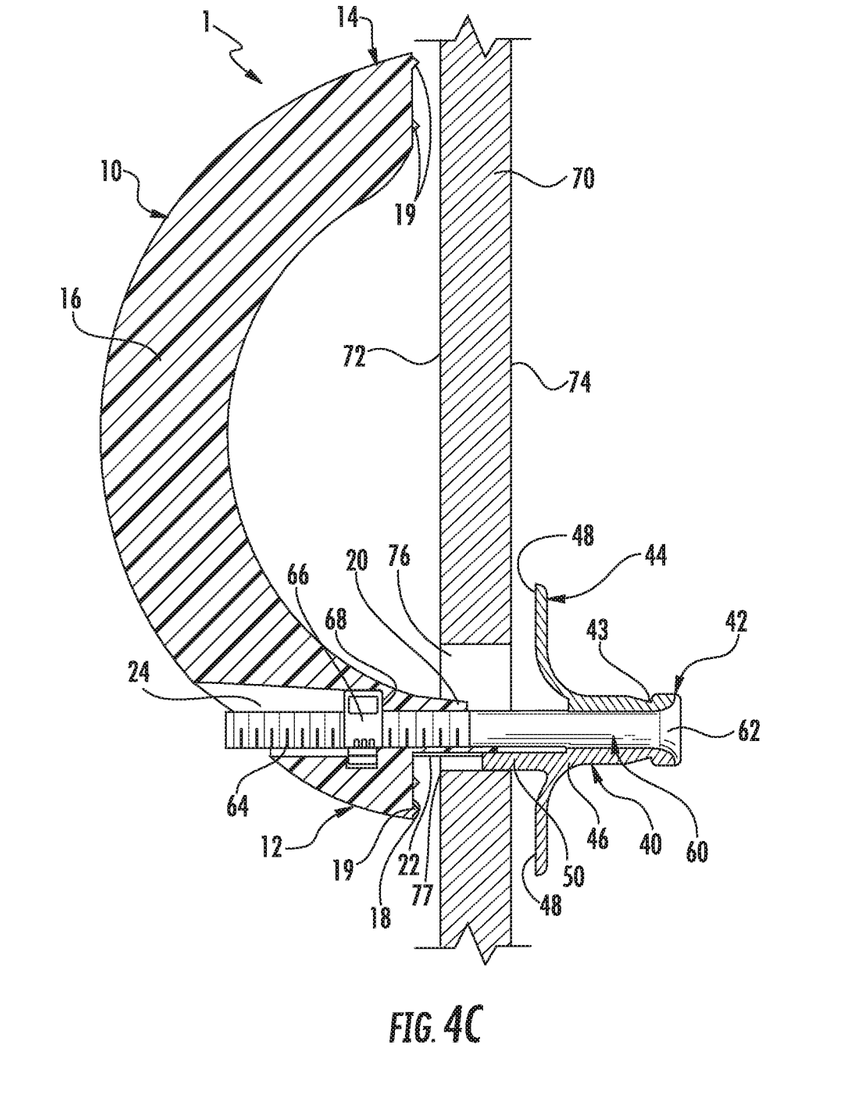
FIG. 4C is a cross-sectional view of the mounting system of FIG. 4A repositioned in the hole.
Figure 4D:
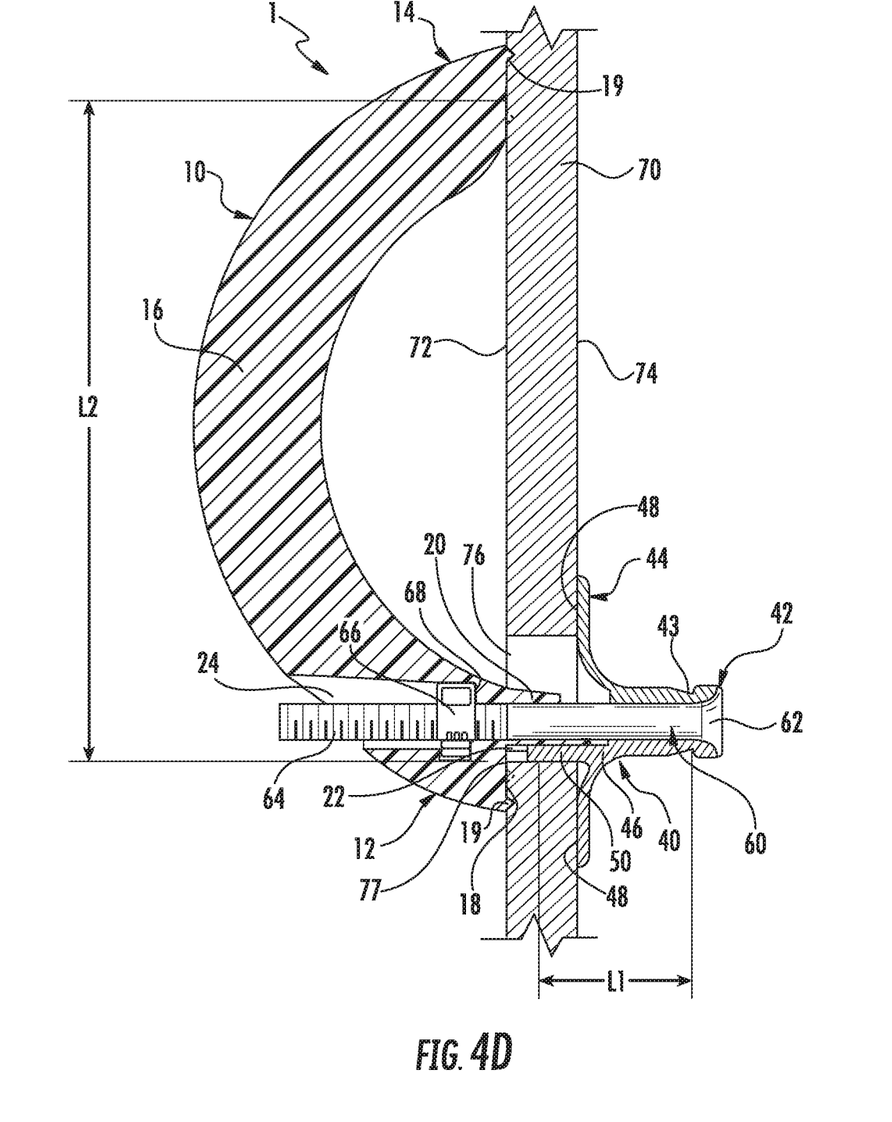
FIG. 4D is a cross-sectional view of the mounting system of FIG. 4A secured to the wall.
Figure 5A:
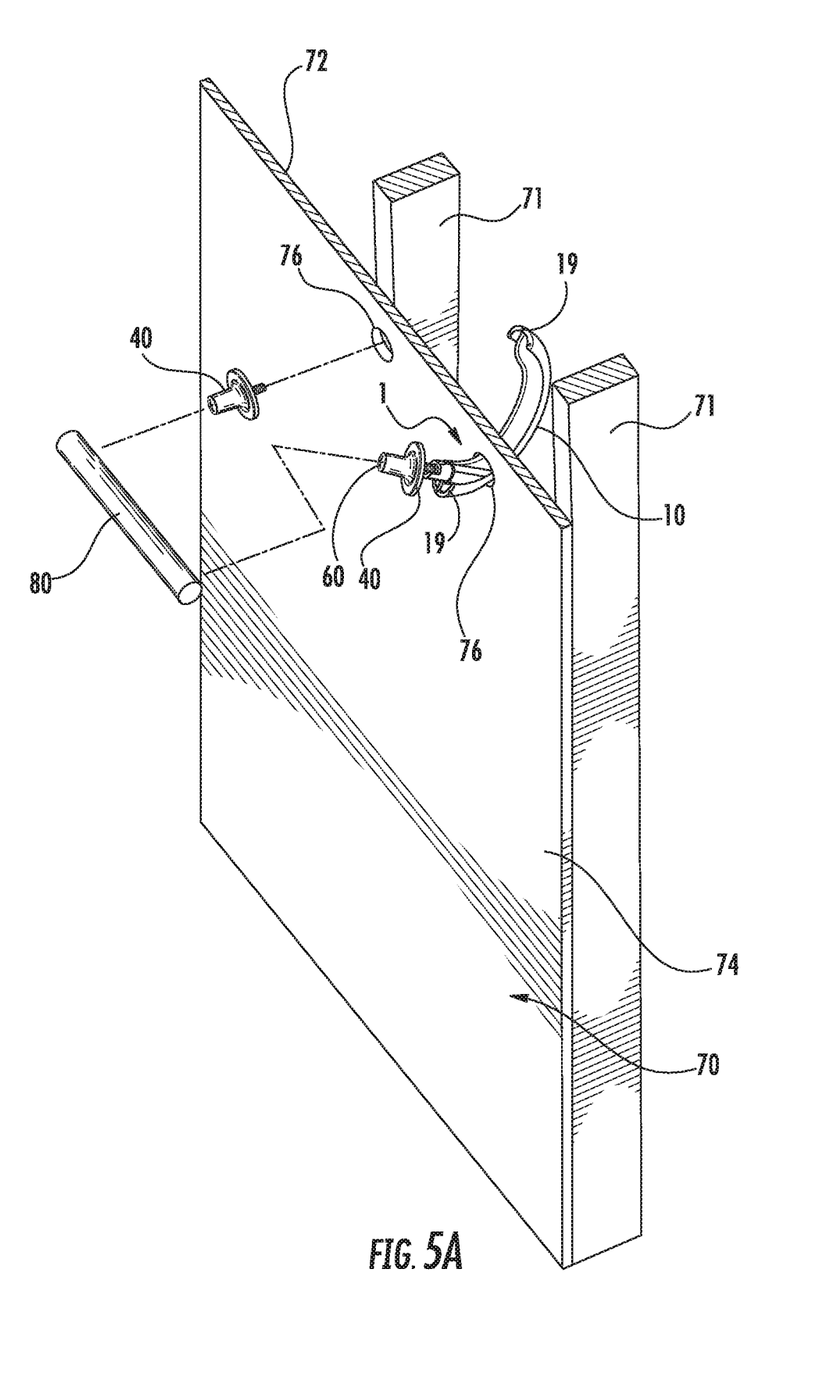
FIG. 5A is an exploded view of the mounting system for positioning on a wall, according to an exemplary embodiment.
Figure 5B:
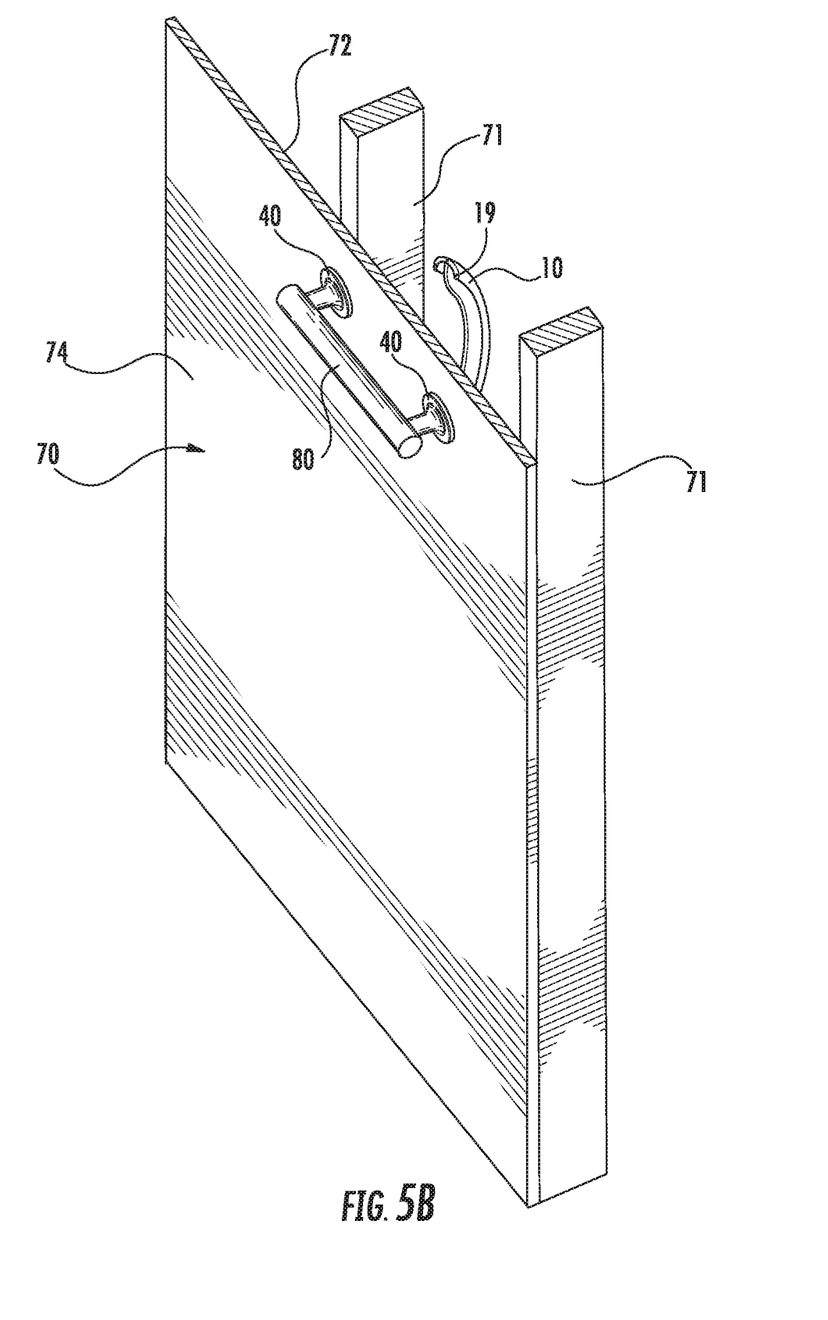
FIG. 5B is a front perspective view of the mounting system of FIG. 5A installed on a wall with a fixture.
Figure 5C:
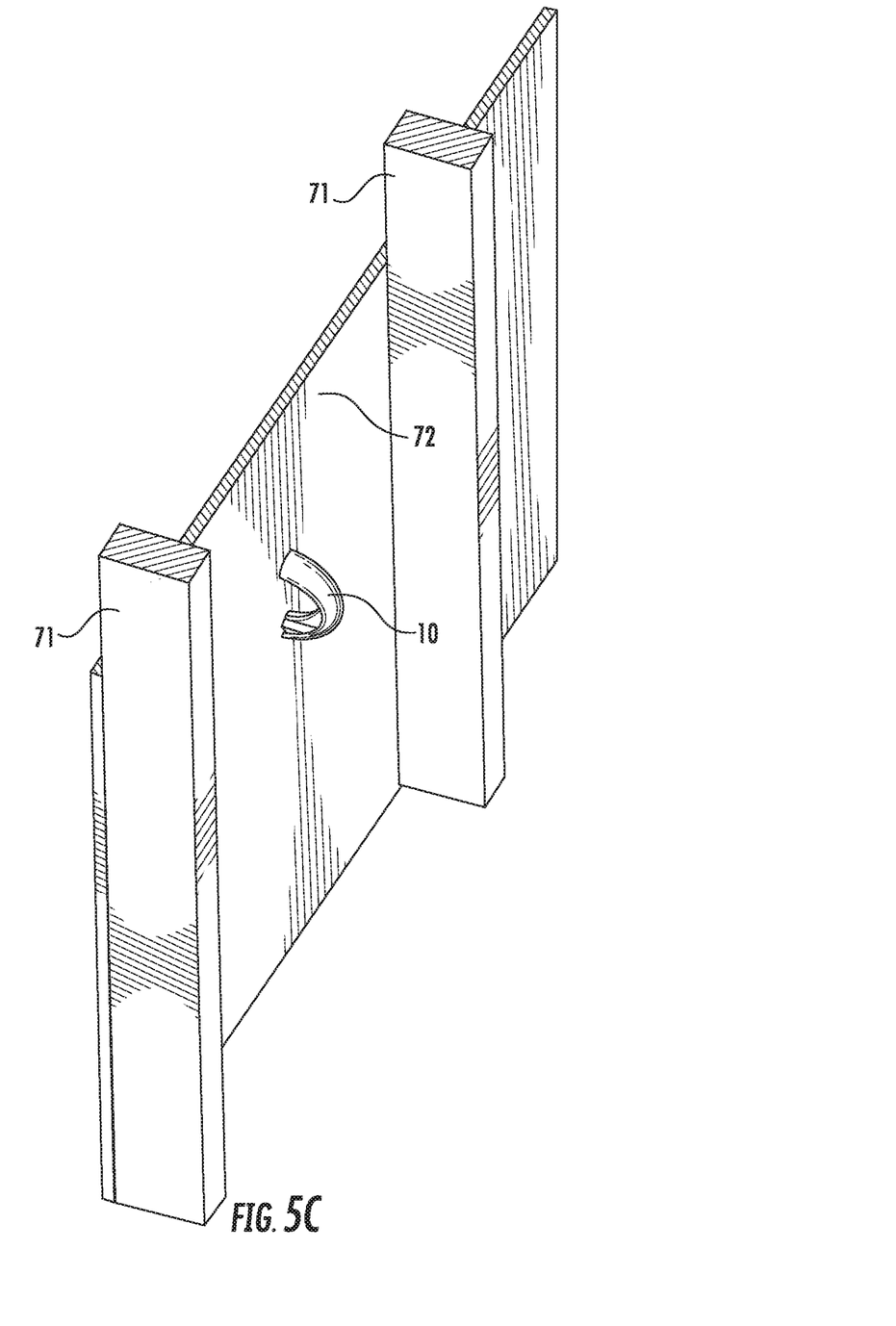
FIG. 5C is a rear perspective view of the mounting system of FIG. 5A installed on a wall.

Referring generally to FIGS. 4A-4D, the mounting system 1 may be installed in the wall 70 according to an exemplary embodiment. Referring to FIGS. 4A and 4B, a user forms the hole 76 in the wall 70 at a location that may be remote from a stud 71. For example, the user may drill a hole from the front side 74 to the rear side 72 of the wall 70, forming the hole 76 all the way through. According to other exemplary embodiments, the hole 76 may be formed in other ways. The first end 12 of the arm 10 is inserted into the hole 76 and fed through the hole 76 along an arced path generally corresponding with the profile of the body 16 (e.g., the first member 27). When the arm 10 is fed all the way through the hole 76, the end surface 18 of the arm 10 rests proximate the rear side 72 of the wall 70 and the end surface 48 of the bracket 40 rests proximate the front side 74 of the wall 70. Referring to FIG. 4C, the mounting system 1 is repositioned (e.g., moved, lowered) toward an edge 77 of the hole 76, such that the arm 10 is received in the hole 76 with an interference fit and cannot be withdrawn without returning the projection 20 toward a center of the hole 76. For example, as shown in FIG. 4D, when the arm 10 is repositioned, the projection 20 engages the edge 77 of the hole 76, and the end surface 18 of the arm 10 overlaps and engages the rear side 72 of the wall 70. This overlap forms an interference fit between the arm 10 and the hole 76, preventing the arm 10 from being withdrawn through the hole 76. In this configuration, the second end 14 of the arm 10 engages the rear side 72 of the wall 70 at a location offset from the hole 76 (e.g., offset from the fastener 60), for example, at a distance L2 from the bottom edge 77 of the hole 76.

The user may reorient the arm 10 by rotating the bracket 40 about the fastener 60. The interaction of the key 52 with the groove 22 causes the rotational position of the arm 10 to be fixed relative to the rotational position of the bracket 40. The user may orient the bracket 40 such that the directional guide 45 is oriented in the desired direction. For example, the user rotates the bracket 40 such that the arm 10 is in a substantially vertical orientation, the arm 10 extending upward from the hole 76. In this configuration, a downward load applied to the bracket 40 is distributed, at least in part, to the rear side 72 of the wall 70 where the second end 14 of the arm 10 engages the wall 70. The load on the bracket 40 may be distributed to the wall 70, reducing the overall load on the wall 70 at a given point by mechanical advantage. According to an exemplary embodiment, the point load applied at a distance L1 from a center of the wall 70 is reduced by a factor of approximately L1/L2 provided that L1 is less than L2. The point load can further be decreased by either increasing the length of the arm 10 (i.e., increasing L2) or decreasing a length of the body 46 of the bracket 40 (i.e., decreasing L1).

The mounting system 1 is secured to the wall 70 by tightening the fastener 60. For example, where the fastener 60 is a screw or a bolt, a tool (e.g., a screw driver) is received in the head 62 and rotates the fastener 60. The fastener 60 threadably engages the nut 66, which interacts with the shoulder 68 of the bore 24 to bring the arm 10 and the bracket 40 toward each other. According to another exemplary embodiment, the fastener 60 threadably engages the bore 24 without the nut 66. When the fastener 60 is tightened, the second end 14 of the arm 10 is brought into engagement with the rear side 72 of the wall 70. The mounting system 1 may frictionally engage the wall 70, holding the mounting system 1 rotationally fixed. For example, force applied to the rear side 72 of the wall 70 by the second end 14 of the arm 10 may prevent rotation of the arm 10. According to another exemplary embodiment, the wall 70 may be held in compression between the end surface 18 of the arm 10 and the end surface 48 of the bracket 40, such that the friction between the end surface 18 and the rear side 72 of the wall 70 and the end surface 48 and the front side 74 of the wall 70 prevents the mounting system 1 from moving with respect to the hole 76.

Referring to FIGS. 5A-5C, the fixture 80 is received on the bracket 40. According to an exemplary embodiment, the fixture 80 defines at least one opening configured to receive the first end 42 of the bracket 40. Once the fixture 80 is fed onto the bracket 40, a set screw is received in the inset portion 43 of the first end 42, holding the fixture 80 in place on the bracket 40 with an interference fit. According to other exemplary embodiments, the bracket 40 may engage the fixture 80 in other ways. For example, the bracket 40 may include a threaded post for threadably engaging the fixture 80, the bracket 40 may define a saw-tooth form for a push-on style connector, or the fixture 80 may include a circular spring clip for engaging the insert portion 43. According to an exemplary embodiment, the bracket 40 may be concealed either partly or entirely by the fixture 80.

According to an exemplary embodiment, the fixture 80 may be secured to the wall 70 at more than one location. As shown in FIGS. 5B and 5C, the fixture 80 is coupled to the wall 70 at one location in a stud 71 and coupled to the wall 70 at a second location with a mounting system 1. For example, the fixture 80 or a bracket 40 without an arm 10 may be screwed directly into the stud 71, where the fastener 60 (i.e., second fastener) is a screw. The mounting system enables a fixture 80 having a length between mounting locations that is different than the spacing between studs 71 to be securely installed on a wall 70. According to another exemplary embodiment, the fixture 80 may be secured to the wall 70 with two or more mounting systems 1. Each mounting system 1 may be received in a corresponding hole 76 (i.e., first and second holes 76). For example, a user may install the fixture 80 in a location remote from studs 71 or in an orientation (e.g., vertically) at a location where the fixture 80 does not intersect with a stud 71.

According to an exemplary embodiment, the mounting system 1 may be removed from the wall 70 by reversing the steps described above. The fastener 60 is loosened, such that the end surface 18 of the arm 10 and the end surface 48 of the bracket 40 no longer hold the wall 70 in compression and may slide along the respective sides 72, 74 of the wall 70. The fastener 60 is loosened less than the entire length of the body 64 of the fastener 60, such that the arm 10 and the bracket 40 remain coupled by the fastener 60.

The user repositions the bracket 40 until the end surface 18 of the arm 10 is substantially centered relative to the hole 76. In this configuration, the end surface 18 no longer provides an interference fit with the hole 76 and the arm 10 can be withdrawn from the rear side 72 of the wall 70. The user pulls the arm 10 through the hole 76 toward the front side 74 of the wall, along an arced path generally corresponding with the profile of the body 16 (i.e., the first member 27) until the entire arm 10 is removed from the hole 76. Advantageously, the mounting system 1 may be removed from the wall 70 without causing any permanent damage to the wall 70 and without leaving additional parts behind the wall 70. Furthermore, the mounting system 1 is reusable (e.g., with another fixture 80 or in another wall 70) because it is removed as one piece.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A mounting system comprising:
an arm having a generally arcuate body extending from a first end to a second end, the first end defining an end surface configured to contact a first side of a wall;
a projection extending from the end surface defined by the first end of the arm; and
a bracket configured to contact a second side of the wall opposing the first side, the bracket adjustably coupled at the first end of the arm by a fastener such that the arm and the bracket are configured to be moved toward each other by the fastener so as to cause the second end of the arm to contact the first side of the wall, wherein the bracket defines an end surface configured to contact the second side of the wall and the bracket comprises a receiver extending from the end surface of the bracket;
wherein the receiver is configured to receive the projection;
wherein one of the projection and the receiver defines a groove;
wherein the other of the projection and the receiver defines a key configured to be received in the groove;
wherein the entire arm is configured to be fed through a hole in the wall from the second side of the wall to the first side of the wall and oriented such that only the first end of the arm and the second end of the arm contact the first side of the wall, wherein a portion of the generally arcuate body located between the first end and the second end is configured to be spaced apart from the wall; and
wherein the second end of the arm is free from the fastener and terminates at an end surface that is configured to contact the first side of the wall at a location offset from the fastener.

2. The mounting system of claim 1, wherein the arm is configured to contact the first side of the wall with an interference fit.

3. The mounting system of claim 1, wherein the fastener further comprises a head and a threaded body, the head engaging the bracket, and the threaded body threadably received in a bore defined in the first end of the arm.

4. The mounting system of claim 3, wherein the bore extends entirely through the arm.

5. The mounting system of claim 4, wherein the fastener extends in the bore entirely through the arm.

6. The mounting system of claim 1, wherein the arm is rotationally fixed about the fastener relative to the bracket.

7. The mounting system of claim 1, wherein the bracket defines an indent configured to receive a set screw for securing a fixture thereto.

8. The mounting system of claim 1, wherein an interaction between the key and the groove rotationally fixes the arm relative to the bracket.

9. The mounting system of claim 1, wherein the generally arcuate body is configured to curve outwardly away from the first side of the wall when the end surface of the second end of the arm contacts the first side of the wall.

10. A mounting system for a wall having a first side, a second side, and a first hole extending therethrough, the mounting system comprising:
a first mounting assembly comprising:
an arm having a generally arcuate body extending from a first end to a second end, the entire arm configured to be fed through the first hole in the wall from the second side of the wall to the first side of the wall and oriented such that only the first end of the arm and the second end of the arm contact the first side of the wall while a portion of the generally arcuate body extending between the first end and the second end is located away from and not in contact with the wall;
a projection extending from the first end, the projection configured to be received in the first hole;
a bracket configured to contact the second side of the wall, the bracket defining a receiver configured to receive the projection; and
a fastener configured to extend through the first hole, the fastener adjustably coupling the first end of the arm and the bracket such that the arm and the bracket are configured to be moved toward each other by the fastener so as to cause the second end of the arm to contact the first side of the wall;
wherein the first end of the arm is configured to contact the first side of the wall; and
wherein the second end of the arm is free from the fastener and terminates at an end surface that is configured to contact the first side of the wall at a location offset from the fastener.

11. The mounting system of claim 10, wherein the arm and the bracket are configured to frictionally contact the wall.

12. The mounting system of claim 11, wherein the arm and the bracket are configured to compress the wall therebetween.

13. The mounting system of claim 10, further comprising a fixture configured to couple to the bracket with an interference fit.

14. The mounting system of claim 10, wherein one of the projection and the receiver defines a groove; and
   wherein the other of the projection and the receiver defines a key configured to be received in the groove.

15. The mounting system of claim 14, wherein an interaction between the key and the groove rotationally fixes the arm relative to the bracket.

16. The mounting system of claim 10, further comprising a second mounting assembly offset from the first mounting assembly, the second mounting assembly configured to extend through a second hole in the wall; and
   a fixture coupled to each of the first and second mounting assemblies.

17. The mounting system of claim 10, further comprising a fixture;
   wherein the fixture is coupled to the first mounting assembly, the first mounting assembly configured to be secured to the wall at a first location not supported by a stud; and
   wherein the fixture is configured to be coupled to the stud at a second location on the wall.

18. The mounting system of claim 17, further comprising a second bracket configured to be coupled to the stud at the second location by a fastener;
   wherein the fixture is coupled to the second bracket.

19. The mounting system of claim 10, wherein the fastener extends entirely through the arm.

* * * * *